US006778476B2

(12) United States Patent
Tsuboi et al.

(10) Patent No.: US 6,778,476 B2
(45) Date of Patent: Aug. 17, 2004

(54) INFORMATION PLAYBACK APPARATUS (75) Inventors: Yoshinori Tsuboi, Kanagawa (JP);
Masayuki Arai, Tokyo (JP)

(73) Assignee: Sony Corporation (JP)

( * ) Notice: Subject to any disclaimer, the term of this patent is extended or adjusted under 35 U.S.C. 154(b) by 109 days.

(21) Appl. No.: 10/145,114

(22) Filed: May 15, 2002

(65) Prior Publication Data

US 2002/0191507 A1 Dec. 19, 2002

(30) Foreign Application Priority Data

May 24, 2001 (JP) ...................................... P2001-156083

(51) Int. Cl.$^7$ ................................................ G11B 7/00
(52) U.S. Cl. ............................ 369/47.22; 369/47.27; 369/275.3
(58) Field of Search ........................... 369/47.1, 47.15, 369/47.21, 47.22, 47.31, 47.27, 47.47, 53.1, 59.1, 275.1, 275.3

(56) References Cited

U.S. PATENT DOCUMENTS 6,172,952 B1 * 1/2001 Inokuchi et al. ......... 369/47.55
6,208,614 B1 * 3/2001 Kim ........................ 369/275.4

* cited by examiner

Primary Examiner—Muhammad Edun
(74) Attorney, Agent, or Firm—Rader, Fishman & Grauer PLLC; Ronald P. Kananen (57) ABSTRACT An information playback apparatus is disclosed which can play back information with a high degree of accuracy. The information playback apparatus plays back the addresses from a recording medium on which a land address and a groove address are recorded at positions displaced from each other. The information playback apparatus includes an AM detection circuit for detecting an AM read out from the recording medium to produce an AM detection pulse signal, a masking signal production circuit and an AND circuit for removing, when a pickup scans the land, an AM detection pulse produced while the pickup passes the land adjacent an area in which the groove address is recorded but removing, when the pickup scans the groove, an AM detection pulse produced while the pickup passes the groove adjacent an area in which the land address is recorded to produce a synchronism detection signal, and an address data decoding circuit for decoding the information in response to the synchronism detection signal to produce address data.

2 Claims, 6 Drawing Sheets

INFORMATION PLAYBACK APPARATUS

BACKGROUND OF THE INVENTION

This invention relates to an information playback apparatus for playing back information recorded on a recording medium.

A technique for magneto-optically recording information onto a disk and playing back the recorded information has conventionally been developed, and as the amount of information handled increases, increase of the disk capacity is demanded. Here, since it is demanded to decrease the size itself of the magneto-optical disk taking facility in handling and so forth into consideration, the density of information recorded on the magneto-optical disk has been and is being increased. One of available techniques for increasing the density of information recorded on the magneto-optical disk is to decrease the track width.

This method, however, gives rise to a problem that, as the distance between adjacent tracks, that is, the track pitch, decreases, it becomes liable to detect an address signal recorded on an adjacent track as crosstalk.

In particular, because of the fact that the track pitch is small, a pickup may possibly read an address different from a correct address signal, resulting in failure in detection of a correct address. If a correct address cannot be detected, information cannot be recorded or played back at the correct position of the magneto-optical disk.

Further, if a synchronizing signal included in an address recorded in an adjacent track is detected, then an address decoding circuit provided in a disk drive apparatus which drives the magneto-optical disk operates inadvertently. Consequently, there is a problem that the disk drive apparatus may operate in a similar manner as in a case wherein an error occurs with reading out of an address. Such problems as described above significantly appear particularly where the disk drive apparatus which plays back information recorded on the magneto-optical disk suffers from disturbance and scanning of the pickup is rendered less accurate thereby.

SUMMARY OF THE INVENTION

It is an object of the present invention to provide an information playback apparatus which can play back information with a high degree of accuracy.

According to an aspect of the present invention, there is provided an information playback apparatus which plays back a land address and a groove address, from a recording medium on which a land and a groove are formed adjacently each other such that the land address is recorded on the land and the groove address is recorded at a position of the groove displaced from the land address in a direction along which the land and the groove extend, including:

information readout means for reading out information recorded on the recording medium, by scanning the land or the groove;

detection means for detecting the land address or the groove address included in the information read out by the information readout means to produce a detection signal and output the detection signal;

masking means for masking, the detection signal produced while the information readout means passes the land adjacent to an area in which the groove address is recorded in case that the information readout means scans the land, and the detection signal produced while the information readout means passes the groove adjacent to an area in which the land address is recorded in case that the information readout means scans the groove, within the detection signal supplied from the detection means to produce a synchronism detection signal; and decoding means for decoding the information read out by the information readout means in response to the synchronism detection signal produced by the masking means to produce the land address or the groove address.

With the information playback apparatus, a synchronism detection signal can be produced while a detection signal produced through crosstalk is eliminated with certainty by the masking means. Consequently, the land address and the groove address can be played back with a high degree of accuracy. Accordingly, the accuracy in information playback can be raised.

Preferably, the information playback apparatus further includes error detection means for detecting an error portion included in the land address or the groove address produced by the decoding means, and producing and outputting a notification signal representing that the land address or the groove address is correct data in case that the error portion is not detected, and wherein the masking means includes masking signal production means for producing a masking signal having a predetermined logic level in a predetermined period for which the detection signal is masked by counting the period of time after a point of time at which the notification signal is supplied from the error detection means, and operation means for performing two-input logical operation between the detection signal and the masking signal to produce the synchronism detection signal.

With the information playback apparatus, an influence of crosstalk upon reading out of an address can be eliminated using a simple configuration and with certainty. Consequently, the accuracy in information playback can be raised without increasing the circuit scale or the cost significantly.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figures 1A, 1B:
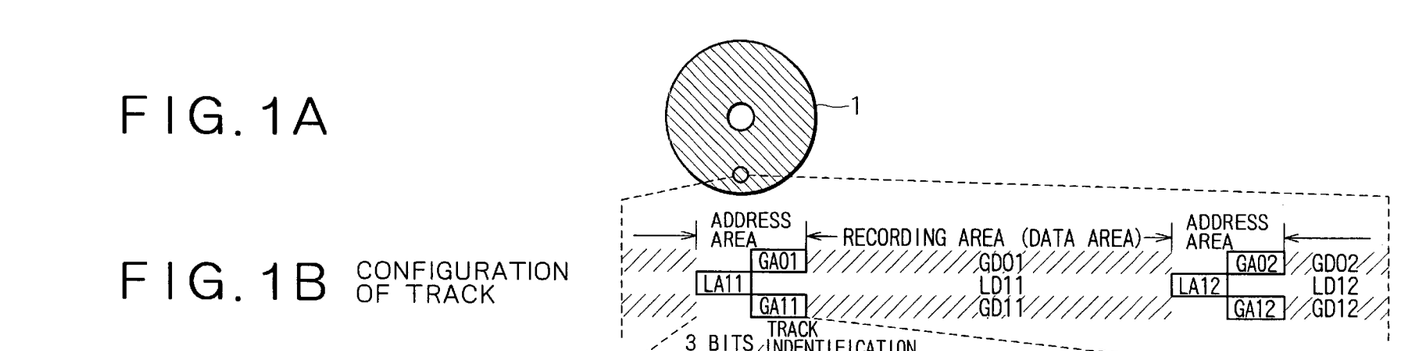
FIGS. 1A to 1E are diagrammatic views illustrating a configuration of a magneto-optical disk which is used in an information playback apparatus according to the present invention.
Figures 1C, 1D, 1E:
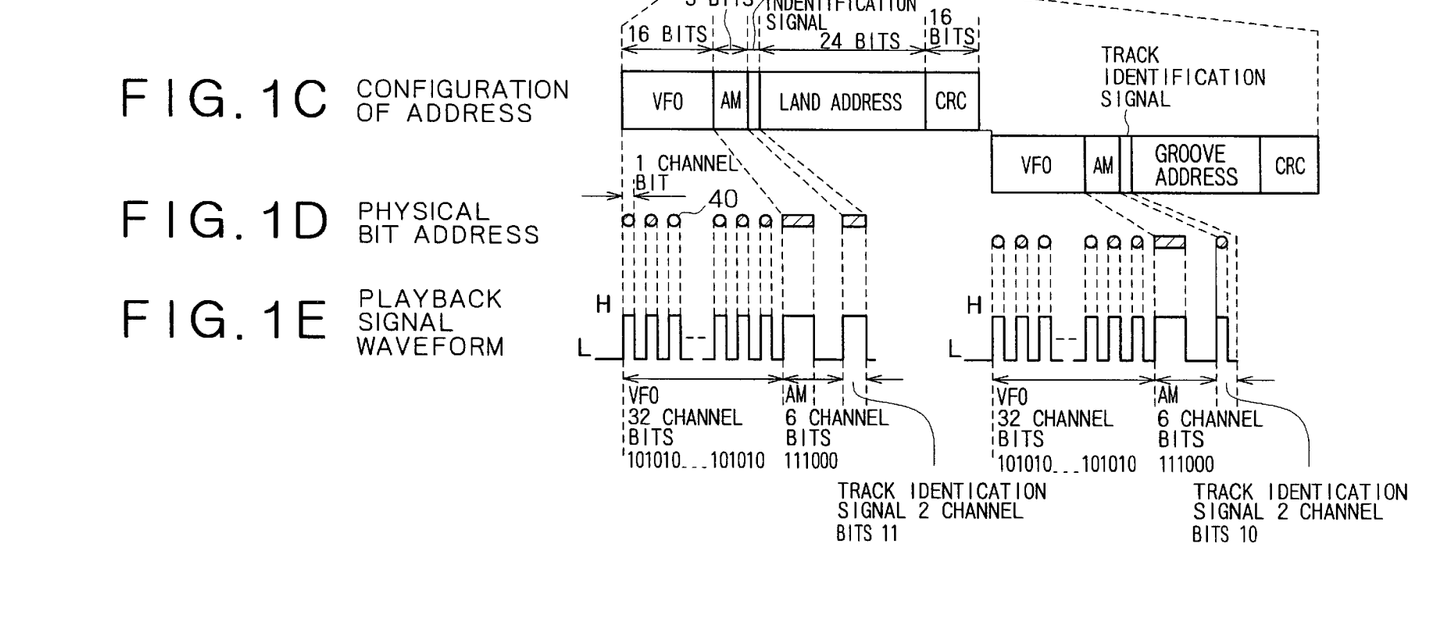

Referring first to FIGS. 1A to 1E, there is shown a configuration of a magneto-optical disk 1 which is employed in an information playback apparatus according to the present invention. More particularly, FIG. 1A shows a profile of the magneto-optical disk 1; FIG. 1B shows a configuration of tracks formed on the magneto-optical disk 1 shown in FIG. 1A; FIG. 1C shows a configuration of addresses recorded on the tracks shown in FIG. 1B; FIG. 1D shows a physical bit address which forms the address shown in FIG. 1C; and FIG. 1E shows a waveform of a signal played back from the bit address shown in FIG. 1D.

As seen from FIG. 1B, the magneto-optical disk 1 used in the information playback apparatus of the present invention is a land/groove disk wherein information is recorded on both of grooves each in the form of a guide groove and a portion called land formed between the grooves. Address information is recorded in each of address areas of tracks formed from the land and the grooves, and data are recorded in recording areas or data areas.

More particularly, land addresses LA11 and LA12 are recorded on the land in the address areas, and groove addresses GA01 and GA11 are formed at positions of the adjacent grooves on the opposite sides of the land displaced in the same direction of a circumferential direction from the land address LA11, and groove addresses GA02 and GA12 are recorded at positions of the adjacent grooves displaced in the same direction of the circumferential direction from the land address LA12.

On the other hand, land data LD11 and LD12 are recorded on the land in the data areas. Further, groove data GD01 and GD11 are recorded on the adjacent grooves on the opposite sides of the land on which the land data LD11 is recorded, and groove data GD02 and GD12 are recorded on the adjacent grooves on the opposite sides of the land on which the land data LD12 is recorded.

Here, the land address LA11 and the groove address GA11 have a similar configuration. In particular, as seen in FIG. 1C, each of the land address LA11 and the groove address GA11 includes a PLL pull-in pattern (VFO) of 16 bits for establishing synchronism, an address mark (AM) signal of 3 bits representative of the top location of data, a track identification signal of 1 bit for identifying the track, an address signal of 24 bits representative of a location of data, and an error detection signal (CRC) of 16 bits for warranting the accuracy of transmitted data, recorded in this order thereon.

The VFO, AM signal and track identification signal mentioned above are formed from data of 1 or 0 corresponding to presence or absence of a pit 40 as seen in FIG. 1D. For example, 0 is allocated as the track identification signal of a land address, and 1 is allocated as the track identification signal of a groove address.

It is to be noted that the track identification signal is supplied as part of address data to a controller 8 which is hereinafter described with reference to FIG. 2, and the controller 8 confirms whether or not a pickup 3 is scanning a track designated by the controller 8.

For the signal described above, biphase modulation of converting information of 1 bit into information of 2 bits is adopted, and consequently, information of 1 bit is converted into 2 channel bits. Here, the biphase nodulation modulates information in accordance with Table 1 given below:

TABLE 1

| IMMEDIATELY PRECEDING MODULATION DATA | ADDRESS DATA | MODULATION DATA |
|---|---|---|
| 0 | 0 | 11 |
| 1 | 0 | 00 |
| 0 | 1 | 10 |
| 1 | 1 | 01 |

In particular, as seen from Table 1 above, address data is modulated in accordance with the immediately preceding modulation data. Thus, for example, when the address data is 0, if the immediately preceding data is 0, then the resulting modulation data is "11", but if the immediately preceding data is 1, then the resulting modulation data is "00". On the other hand, when the address data is 1, if the immediately preceding data is 0, then the resulting modulation data is "10", and if the immediately preceding data is 1, then the resulting modulation data is "01". It is to be noted that, in the demodulation, when the modulation data is "00" or "11", the resulting or original address data is 0, and when the modulation data is "10" or "01", the original address data is 1.

Since, in patterns of modulation data according to such a modulation system as described above, the value 0 or 1 successively appears twice in the maximum, the AM signal uses a pattern in which each of 1 and 0 successively appears three times like, for example, "111000".

A playback signal by the biphase modulation system described above is a pulse wave signal which has the high level (H) corresponding to the modulation data 1 and has the low level (L) corresponding to the modulation data 0 as seen from FIG. 1E.

Now, a disk drive apparatus to which the present invention is applied is described. Referring to FIG. 2, there is shown a general configuration of the disk drive apparatus. The disk drive apparatus has the magneto-optical disk 1 mounted thereon and includes a spindle servo circuit 2, a pickup 3, a servo circuit 4, an external magnetic field generating coil 5, a laser power control circuit 6, an address signal demodulation circuit 7, a controller 8, an MO signal demodulation circuit 9, a modulation circuit 10 and a magnet drive circuit 11.

The servo circuit 4, laser power control circuit 6 and address signal demodulation circuit 7 are connected to the controller 8, and the pickup 3 is connected to the servo circuit 4 and the laser power control circuit 6. The address signal demodulation circuit 7 and MO signal demodulation circuit 9 are connected to the pickup 3. The magnet drive circuit 11 is connected to the modulation circuit 10, and the external magnetic field generating coil 5 is connected to the magnet drive circuit 11.

In the following, operation of the disk drive apparatus having the configuration described above is described. The spindle servo circuit 2 rotates a magneto-optical disk 1 loaded in position in the disk drive apparatus at a predetermined speed, and the pickup 3 emits a laser beam to a predetermined position of the magneto-optical disk 1 under the control of the servo circuit 4. The intensity of the laser beam is controlled by the laser power control circuit 6. The external magnetic field generating coil 5 which is driven by the magnet drive circuit 11 is disposed on an extension line of the laser beam.

The pickup 3 reads out address information recorded as concave and convex pits on the magneto-optical disk 1 as a light intensity signal (PIT RF), and inputs the signal to the address signal demodulation circuit 7. A track selection signal of 1 bit for specifying the track on which the address information of the reading out object is recorded is supplied from the controller 8 to the address signal demodulation circuit 7, and therefore, crosstalk between information recorded on the specified track and information recorded on the adjacent track can be prevented. The address signal demodulation circuit 7 decodes sector address information and so forth recorded on the magneto-optical disk 1 and supplies an address position pulse signal and address data to the controller 8. In response to the address position pulse signal and the address data supplied, the controller 8 controls the servo circuit 4 so that the pickup 3 may move to a desired position of the magneto-optical disk 1.

Meanwhile, recording data are first supplied to the modulation circuit 10. The modulation circuit 10 performs such EFM (Eight to Fourteen Modulation) plus conversion as is employed, for example, for a DVD (Digital Versatile Disk) for the received recording data. The modulation data are inputted to the magnet drive circuit 11, and the external magnetic field generating coil 5 generates a recording magnetic field having the positive or negative polarity in accordance with the modulation data. Simultaneously, the controller 8 sets an emission intensity to the laser power control circuit 6 so that the laser beam to be emitted from the pickup 3 may have an optimum intensity for information recording. Consequently, the information is recorded onto the magneto-optical disk 1 in accordance with the polarity of the recording magnetic field (external magnetic field).

On the other hand, in order to read out (play back) the information recorded in such a manner as described above from the magneto-optical disk 1, the controller 8 moves the pickup 3 to a desired position based on address data supplied thereto from the address signal demodulation circuit 7 to play back a magneto-optical signal (MO RF signal) having an address of the reading out object. The played back MO RF signal is demodulated by the MO signal demodulation circuit 9 to produce playback data.

Figure 2:
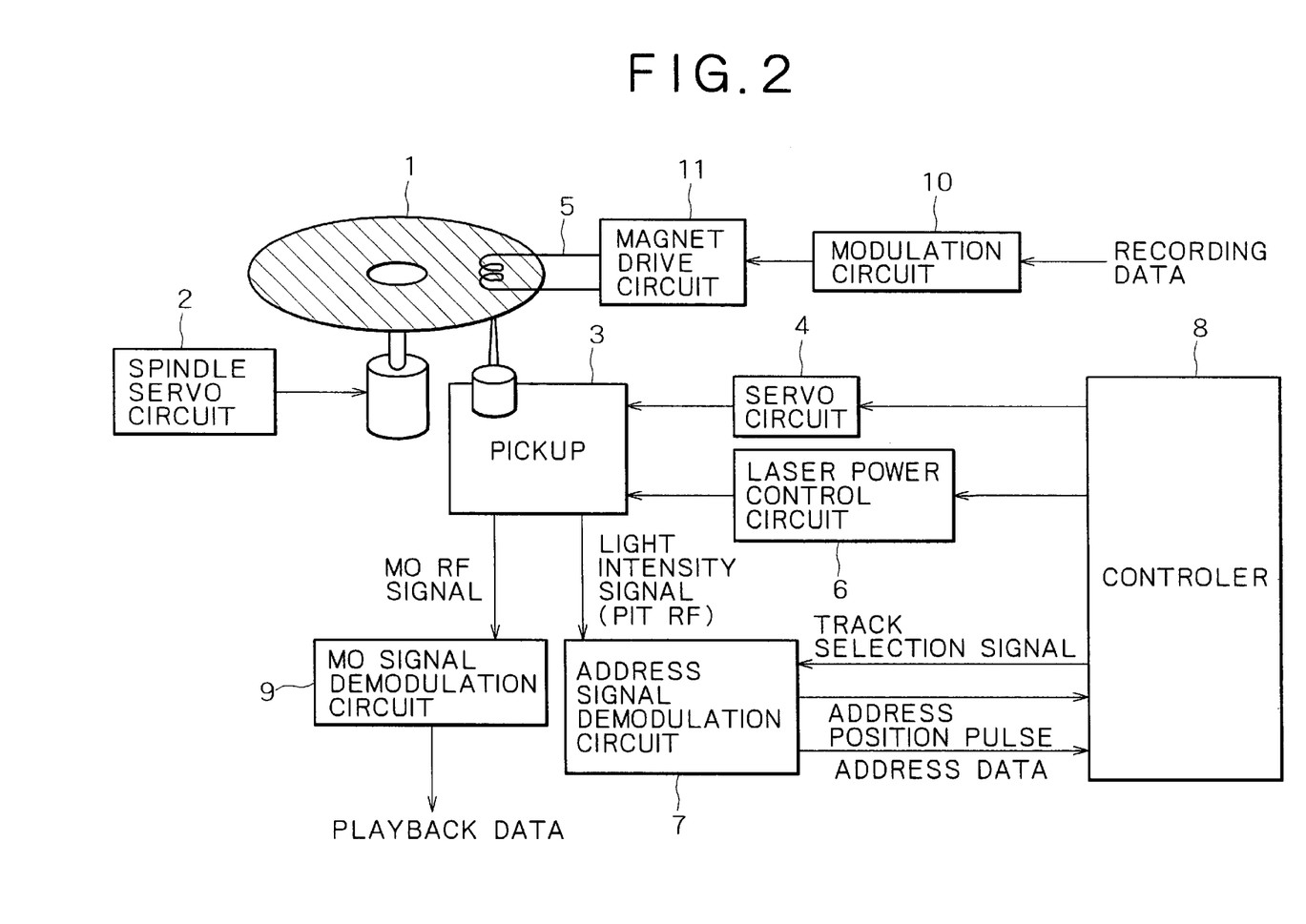
FIG. 2 is a block diagram of a general configuration of a disk drive apparatus to which the present invention is applied.

Recording and playback operations of the disk drive apparatus shown in FIG. 2 are such as described above. In such recording and playback operations, the position at which information is recorded onto or played back from the magneto-optical disk 1 is determined based on address information recorded on the magneto-optical disk 1 in advance.

Figure 3:
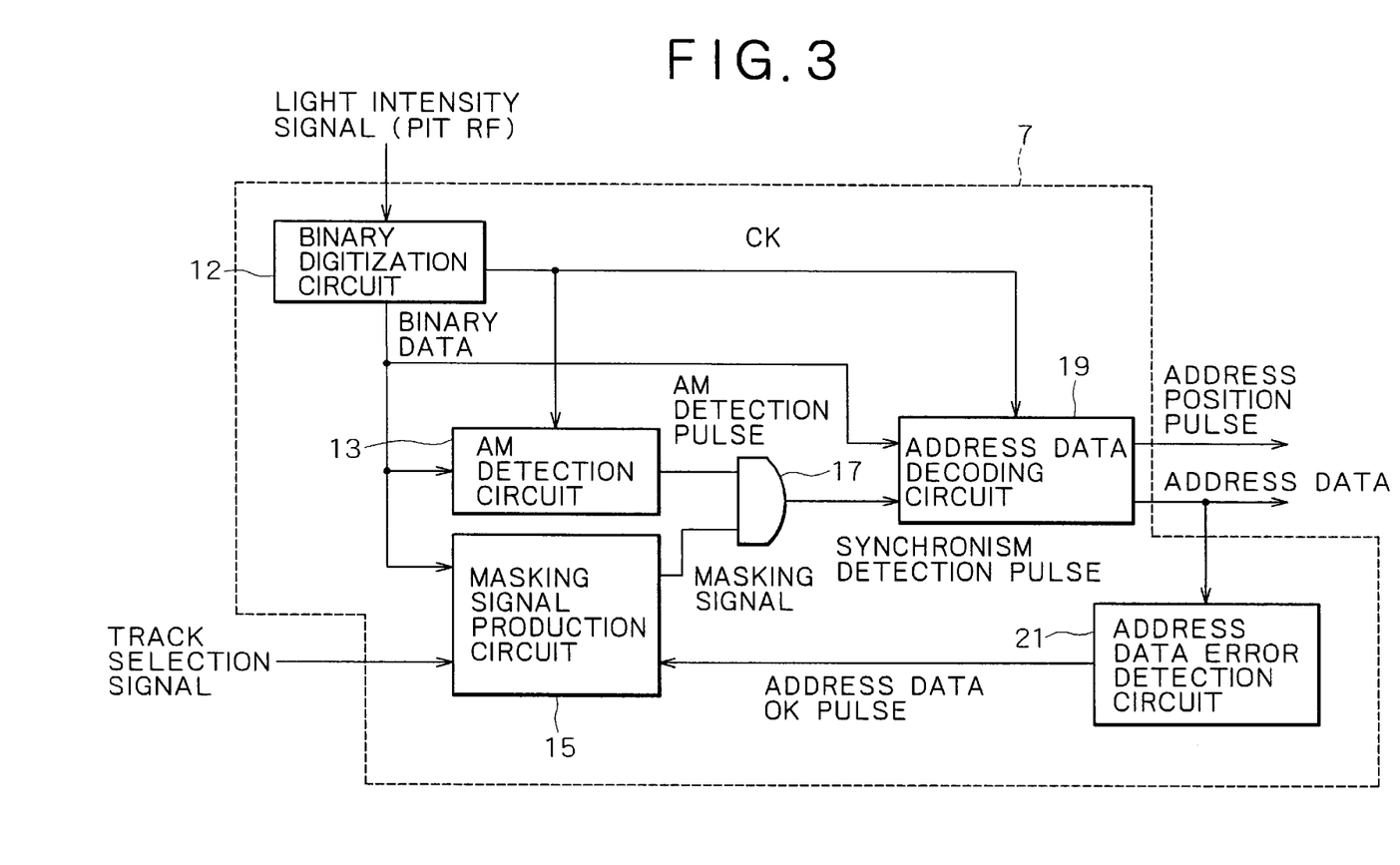
FIG. 3 is a block diagram showing a configuration of an address signal demodulation circuit shown in FIG. 2.

FIG. 3 shows a configuration of the address signal demodulation circuit 7 shown in FIG. 2. Referring to FIG. 3, the address signal demodulation circuit 7 includes a binary digitization circuit 12, an AM detection circuit 13, a masking signal production circuit 15, an AND circuit 17, an address data decoding circuit 19, and an address data error detection circuit 21.

The AM detection circuit 13, masking signal production circuit 15 and address data decoding circuit 19 are connected to the binary digitization circuit 12, and the AND circuit 17 is connected to the AM detection circuit 13 and masking signal production circuit 15. The address data error detection circuit 21 is connected to the address data decoding circuit 19, and the masking signal production circuit 15 is further connected to the address data error detection circuit 21.

In the following, demodulation operation of an address signal by the address signal demodulation circuit 7 shown in FIG. 3 is described. A light intensity signal played back from the magneto-optical disk 1 by the pickup 3 is supplied to the binary digitization circuit 12, and the binary digitization circuit 12 produces binary data and a clock signal CK based on the light intensity signal. Then, the binary data are supplied to the AM detection circuit 13, masking signal production circuit 15 and address data decoding circuit 19, and the clock signal CK is supplied to the AM detection circuit 13 and the address data decoding circuit 19.

If the AM detection circuit 13 detects the pattern of the AM signal in the binary data supplied thereto from the binary digitization circuit 12, then it produces and outputs an AM detection pulse signal. The address data decoding circuit 19 uses the AM detection pulse signal to demodulate the binary data produced by the binary digitization circuit 12 to produce an address position pulse signal and address data and outputs the address position pulse signal and the address data to the controller 8. Meanwhile, the address data error detection circuit 21 performs a CRC check of the address data produced by the address data decoding circuit 19.

The controller 8 supplies, depending upon whether the area being scanned by the pickup 3 is a land or a groove, a signal of 0 or 1 as a track selection signal to the masking signal production circuit 15. The masking signal production circuit 15 executes a suitable operation based on the address selection signal supplied thereto.

In particular, when the pickup 3 is scanning a land of the magneto-optical disk 1, the masking signal production circuit 15 produces a masking signal of the high level and supplies the masking signal to the AND circuit 17. Accordingly, in this instance, the AND circuit 17 supplies the AM detection pulse signal outputted from the AM detection circuit 13 as it is as a synchronism detection pulse signal to the address data decoding circuit 19. Consequently, the address data decoding circuit 19 decodes the address data in response to the synchronism detection pulse signal supplied thereto from the AND circuit 17. On the other hand, if the address data error detection circuit 21 does not detect an error in the CRC check, then it produces an address data OK pulse signal and supplies it to the masking signal production circuit 15.

As seen in FIG. 1B, on a land in an address area, a land address is recorded in the former half of the address area. Accordingly, when the pickup 3 scans the land, the masking signal production circuit 15 controls the masking signal to the low level (L) in the remaining address area after the address data OK pulse signal is supplied thereto. At this time, the AND circuit 17 is deactivated and stops the supply of the synchronism detection pulse signal to the address data decoding circuit 19, and therefore, erroneous detection of an AM based on a groove address leaking in through crosstalk can be prevented.

On the other hand, when the pickup 3 scans a groove, the masking signal is set to the high level in an initial state, and the AM detection pulse signal outputted from the AM detection circuit 13 is supplied as it is as a synchronism detection pulse signal to the address data decoding circuit 19. The address data decoding circuit 19 thus decodes the address data in response to the synchronism detection pulse signal supplied thereto from the AND circuit 17, and when the address data error detection circuit 21 does not detect an error in the CRC check, it produces and supplies an address data OK pulse signal to the masking signal production circuit 15.

As seen in FIG. 1B, on a groove in an address area, a groove address is recorded in the rear half of the address area. Accordingly, when the pickup 3 scans the groove, after the address data OK pulse signal is received, the masking signal production circuit 15 controls the masking signal to the low level (L) till a timing at which the front half of the next address area is scanned. At this time, the AND circuit 17 is deactivated and stops supply of the synchronism detection pulse signal to the address data decoding circuit 19, and therefore, erroneous detection of an AM based on a land address leaking in through crosstalk can be prevented.

Figure 4:
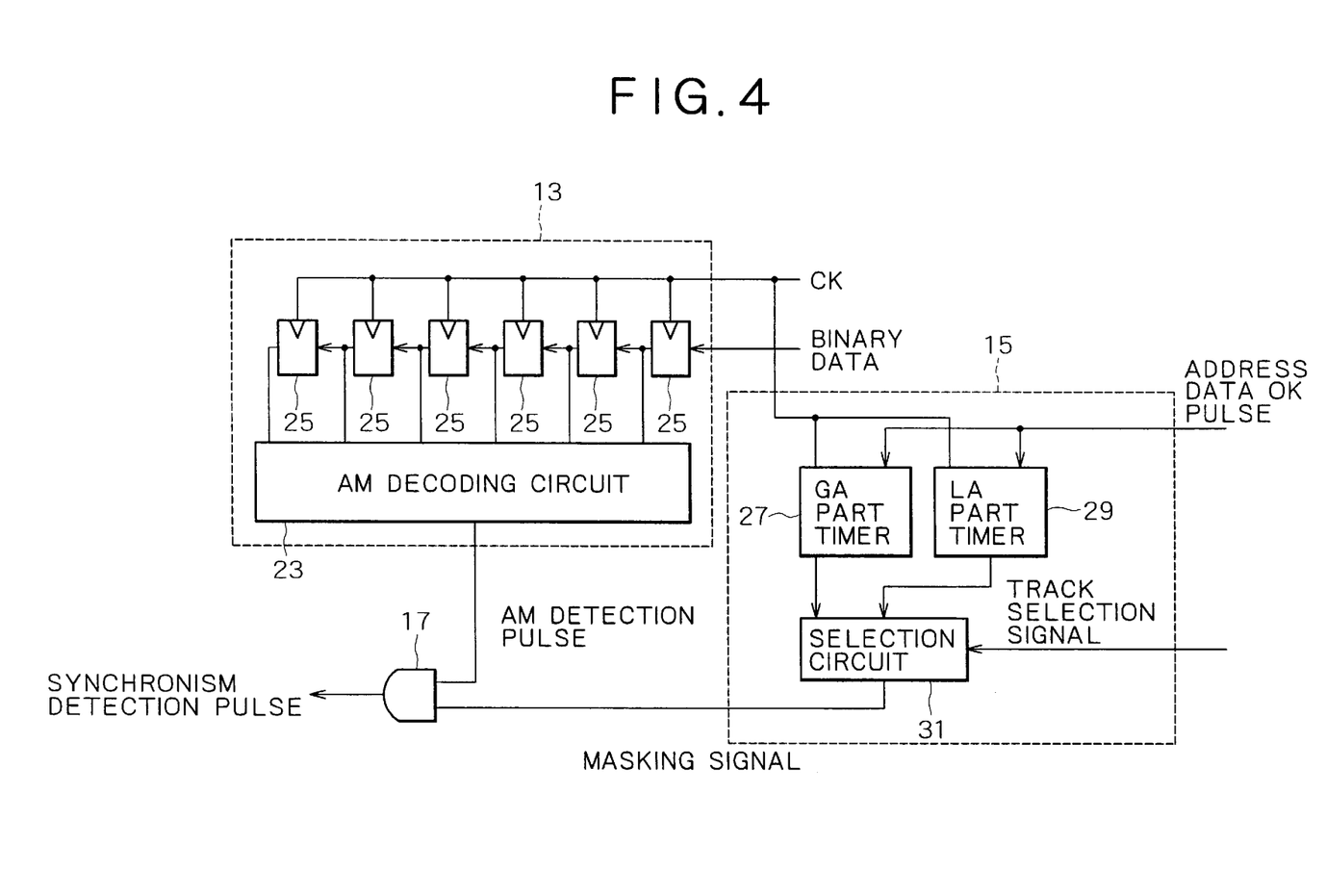
FIG. 4 is a block diagram showing a configuration of an AM detection circuit and a masking signal production circuit shown in FIG. 3.

FIG. 4 shows a configuration of the AM detection circuit 13 and the masking signal production circuit 15 shown in FIG. 3. Referring to FIG. 4, the AM detection circuit 13 includes an AM decoding circuit 23, and a plurality of delay flip-flops 25 which form a 6-bit delay circuit as a whole. The masking signal production circuit 15 includes a GA part timer 27, an LA part timer 29, and a selection circuit 31.

The delay flip-flops 25 are connected in series, and binary data are supplied from the binary digitization circuit 12 to the delay flip-flops 25. Further, the clock signal CK from the binary digitization circuit 12 is supplied to a clock terminal of each of the delay flip-flops 25. The AM decoding circuit 23 is connected to output terminals of the delay flip-flops 25.

The clock signal CK from the binary digitization circuit 12 is supplied also to the GA part timer 27 and the LA part timer 29 included in the masking signal production circuit 15, and also the address data OK pulse signal is supplied from the address data error detection circuit 21 to the GA part timer 27 and the LA part timer 29. The selection circuit 31 is connected to the GA part timer 27 and the LA part timer 29, and the track selection signal is supplied from the controller 8 to the selection circuit 31. The AND circuit 17 is connected to the AM decoding circuit 23 and the selection circuit 31.

In the following, operation of the AM detection circuit 13 and the masking signal production circuit 15 shown in FIG. 4 is described. Each of the six delay flip-flops 25 included in the AM detection circuit 13 transfers binary data to the delay flip-flop 25 in the following stage in response to the clock signal CK supplied thereto. The AM decoding circuit 23 detects the AM pattern from information of the 6 bits supplied thereto from the six delay flip-flops 25 and produces an AM detection pulse signal.

The GA part timer 27 counts down, when the pickup 3 scans a land and reads out a land address, the time from a point of time at which the address data OK pulse signal is received to another point of time at which the scanning of the rear half of the address area to which the land address belongs is completed, and outputs a signal of the low level (L) until the count value thereof decreases to zero after the counting is started. After the count value becomes equal to zero, the GA part timer 27 outputs a signal of the high level (H).

The LA part timer 29 also counts down, when the pickup 3 scans a groove and reads out a groove address, the time from a point of time at which the address data OK pulse signal is received to another point of time at which the scanning of a data area following the groove address is completed, and outputs a signal of the high level (H) until the count value thereof decreases to zero after the counting is started. After the count value becomes equal to zero, the LA part timer 29 outputs a signal of the low level (L) during the scanning of the front half of the address area.

Further, when the pickup 3 scans a land, a track selection signal whose value is 0 is supplied from the controller 8 to the selection circuit 31. The selection circuit 31 selectively outputs the signal outputted from the GA part timer 27 in response to the track selection signal. On the other hand, when the pickup 3 scans a groove, a track selection signal whose value is 1 is supplied from the controller 8 to the selection circuit 31. The selection circuit 31 selectively outputs the signal outputted from the LA part timer 29 in response to the track selection signal.

Figure 5A:
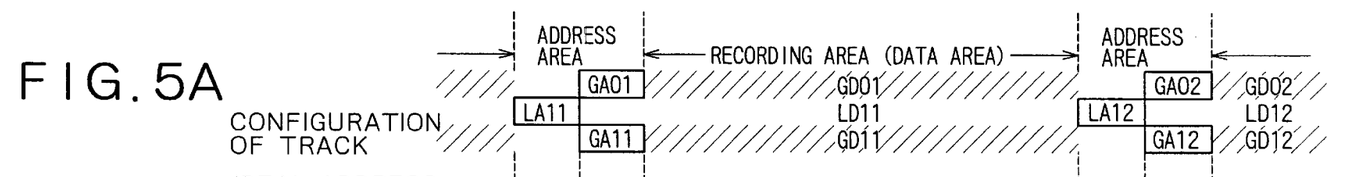
FIGS. 5A to 5F are diagrams illustrating operation of the circuits shown in FIG. 4 when a pickup scans a land.
Figures 5B, 5C, 5D, 5E:
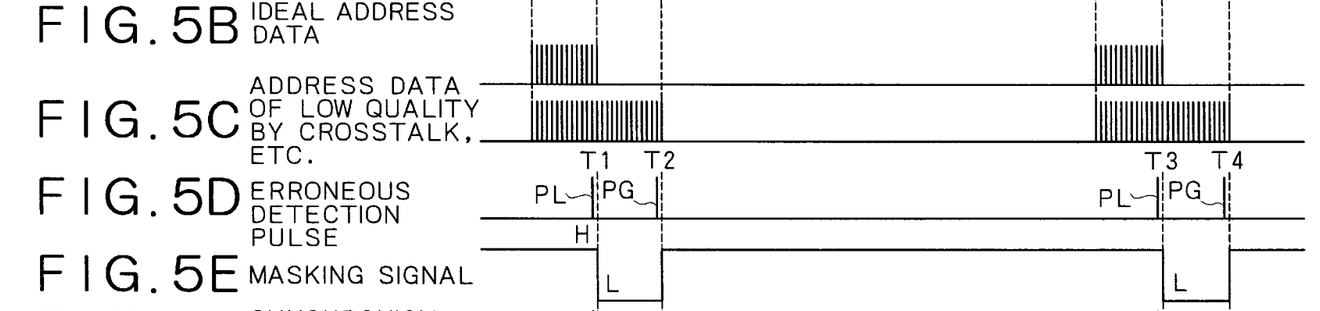
Figure 5F:
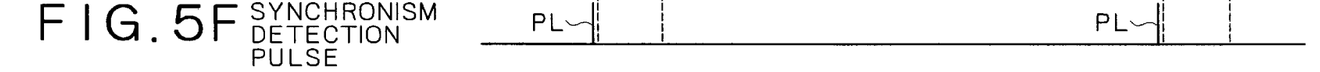

Now, operation when the pickup 3 scans a land is described with reference to FIGS. 5A to 5F. FIG. 5A shows a configuration of tracks formed on the magneto-optical disk 1 similarly to FIG. 1B; FIG. 5B shows ideal address data read out from the land shown in FIG. 5A when the land is scanned by the pickup 3; FIG. 5C illustrates read out address data whose quality is low because of crosstalk or the like when the land shown in FIG. 5A is scanned; FIG. 5D shows an AM detection pulse signal produced through detection in error of an AM; FIG. 5E shows a masking signal produced by the masking signal production circuit 15; and FIG. 5F illustrates a synchronous detection pulse signal outputted from the AND circuit 17.

When the pickup 3 scans a desired land, if crosstalk wherein it reads out a groove address from a groove adjacent the land, then the groove address GA01 or the groove address GA11 is read out in addition to the land address LA11 which is required originally.

At this time, the AM decoding circuit 23 detects an AM included in the land address LA11 and produces and outputs an AM detection pulse PL shown in FIG. 5D, and further detects an AM included in the groove address GA01 or the groove address GA11 and produces and outputs an AM detection pulse PG. Accordingly, when the pickup 3 scans a land in such a manner as described above, if the address data decoding circuit 19 decodes address data in response to the AM detection pulse PG, then correct address data cannot be obtained by the malfunction.

Accordingly, in the disk drive apparatus to which the present invention is applied, the masking signal production circuit 15 produces a masking signal shown in FIG. 5E and the AND circuit 17 arithmetically operates logical ANDing of the masking signal and the AM detection pulse signal to produce only the originally required AM detection pulse PL as a synchronism detection pulse signal. In this manner, when the pickup 3 scans a land, even if crosstalk occurs, only the AM detection pulse PL corresponding to the land address LA11 or LA12 can be used as a synchronism detection pulse signal.

Figure 6A:
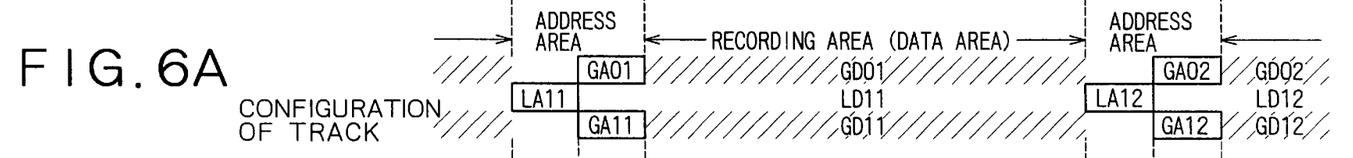
FIGS. 6A to 6F are diagrams illustrating operation of the circuits shown in FIG. 4 when the pickup scans a groove.
Figures 6B, 6C, 6D, 6E:
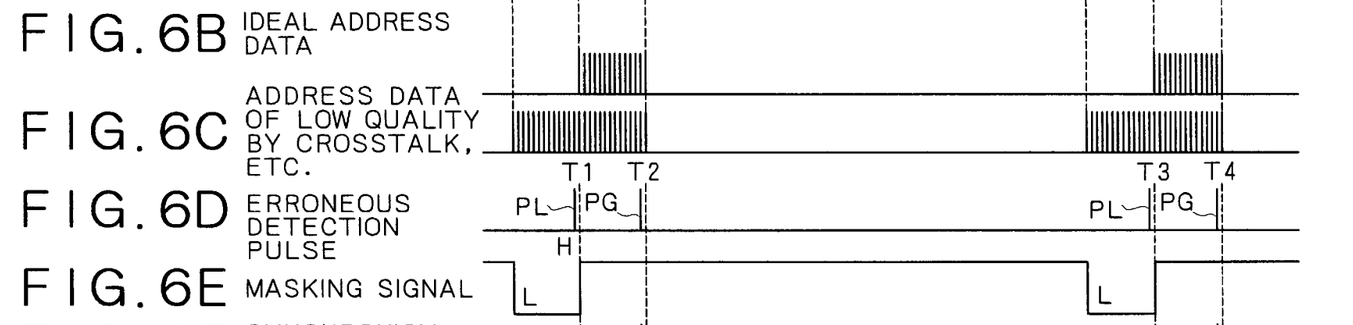
Figure 6F:
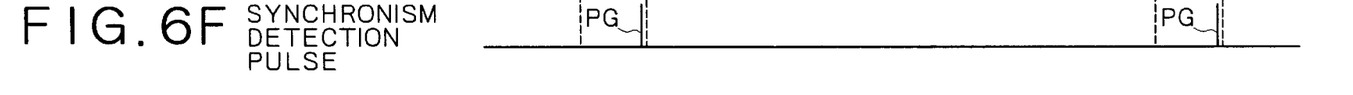

Now, operation when the pickup 3 scans a groove is described with reference to FIGS. 6A to 6F. FIG. 6A shows a configuration of tracks formed on the magneto-optical disk 1 similarly to FIG. 5A; FIG. 6B shows ideal address data read out from the groove shown in FIG. 6A when the groove is scanned by the pickup 3; FIG. 6C illustrates read out address data whose quality is low because of crosstalk or the like when the groove shown in FIG. 6A is scanned; FIG. 6D shows an AM detection pulse signal produced through detection in error of an AM; FIG. 6E shows a masking signal produced by the masking signal production circuit 15; and FIG. 6F illustrates a synchronous detection pulse signal outputted from the AND circuit 17.

When the pickup 3 scans a desired groove, if crosstalk wherein it reads out a land address from a land adjacent the groove, then the land address LA11 is read out in addition to the groove address GA01 (or the groove address GA11) which is required originally.

At this time, the AM decoding circuit 23 detects the AM included in the groove address GA01 (or the groove address GA11) and produces and outputs an AM detection pulse PG shown in FIG. 6D, and further detects the AM included in the land address LA11 and produces and outputs an AM detection pulse PL. Accordingly, when the pickup 3 scans a groove in such a manner as described above, if the address data decoding circuit 19 decodes address data in response to the AM detection pulse PL, then correct address data cannot be obtained by the malfunction.

Accordingly, in the disk drive apparatus to which the present invention is applied, the masking signal production circuit 15 produces a masking signal shown in FIG. 6E and the AND circuit 17 arithmetically operates logical ANDing of the masking signal and the AM detection pulse signal to produce only the originally required AM detection pulse PG as a synchronism detection pulse signal. In this manner, when the pickup 3 scans a groove, even if crosstalk occurs, only the AM detection pulse PG corresponding to the groove address GA01 (or the groove address GA11) can be used as a synchronism detection pulse signal.

As described above, in the disk drive apparatus to which the present invention is applied, when the pickup 3 scans a land of the magneto-optical disk 1, to read out only the land address LA11 or LA12, the AM detection pulse signal is masked within a period within which the pickup 3 scans a land positioned between the groove addresses GA01 and GA11 or GA02 and GA12. Similarly, when the pickup 3 scans a groove of the magneto-optical disk 1, to read out only the groove address GA 01 or GA02 (or the groove address GA11 or GA12), the AM detection pulse signal is masked within a period within which the pickup 3 scans a groove positioned adjacent the area in which the land address LA11 or LA12 is recorded.

Accordingly, with the disk drive apparatus according to the present invention, an influence of crosstalk upon reading out of address information can be prevented using a simple configuration, and playback of accurate address data can be realized to raise the reliability in operation upon reading out of information.

Further, with the magneto-optical disk 1 according to the present invention shown in FIG. 1, since the distance between adjacent tracks can be reduced, the track density can be raised to achieve high density recording of information.

It is to be noted that, although malfunction arising from crosstalk which may possibly occur upon detection of the AM can be prevented by the magneto-optical disk 1 according to the present invention, if such a masking signal as described above is produced to remove unnecessary information at a timing at which the pickup 3 scans an area within which crosstalk between adjacent tracks matters, then a desired signal can be played back accurately in addition to detection of an AM.

While a preferred embodiment of the present invention has been described using specific terms, such description is for illustrative purposes only, and it is to be understood that changes and variations may be made without departing from the spirit or scope of the following claims.

What is claimed is:

1. An information playback apparatus which plays back a land address and a groove address, from a recording medium on which a land and a groove are formed adjacently each other such that the land address is recorded on the land and the groove address is recorded at a position of the groove displaced from the land address in a direction along which the land and the groove extend, comprising:

information readout means for reading out information recorded on the recording medium, by scanning the land or the groove;

detection means for detecting the land address or the groove address included in the information read out by the information readout means to produce a detection signal and output the detection signal;

masking means for masking, the detection signal produced while the information readout means passes the land adjacent to an area in which the groove address is recorded in case that the information readout means scans the land, and the detection signal produced while the information readout means passes the groove adjacent to an area in which the land address is recorded in case that the information readout means scans the groove, within the detection signal supplied from the detection means to produce a synchronism detection signal; and decoding means for decoding the information read out by the information readout means in response to the synchronism detection signal produced by the masking means to produce the land address or the groove address.

2. An information playback apparatus according to claim 1, further comprising error detection means for detecting an error portion included in the land address or the groove address produced by the decoding means, and producing and outputting a notification signal representing that the land address or the groove address is correct data in case that the error portion is not detected, and wherein the masking means includes masking signal production means for producing a masking signal having a predetermined logic level in a predetermined period for which the detection signal is masked by counting the period of time after a point of time at which the notification signal is supplied from the error detection means, and operation means for performing two-input logical operation between the detection signal and the masking signal to produce the synchronism detection signal.

* * * * *

UNITED STATES PATENT AND TRADEMARK OFFICE
CERTIFICATE OF CORRECTION

PATENT NO. : 6,778,476 B2
DATED : August 17, 2004
INVENTOR(S) : Yoshinori Tsuboi et al.

It is certified that error appears in the above-identified patent and that said Letters Patent is hereby corrected as shown below:

Column 10,
Line 7, "adjacently" should read -- adjacent --.
Line 19, "masking," should read -- masking --.

Signed and Sealed this

Twenty-fourth Day of May, 2005

JON W. DUDAS
*Director of the United States Patent and Trademark Office*